Aug. 22, 1939.  J. B. CERNOHOUZ  2,170,630
SCREEN FOCUS COMPENSATOR
Filed Oct. 18, 1937
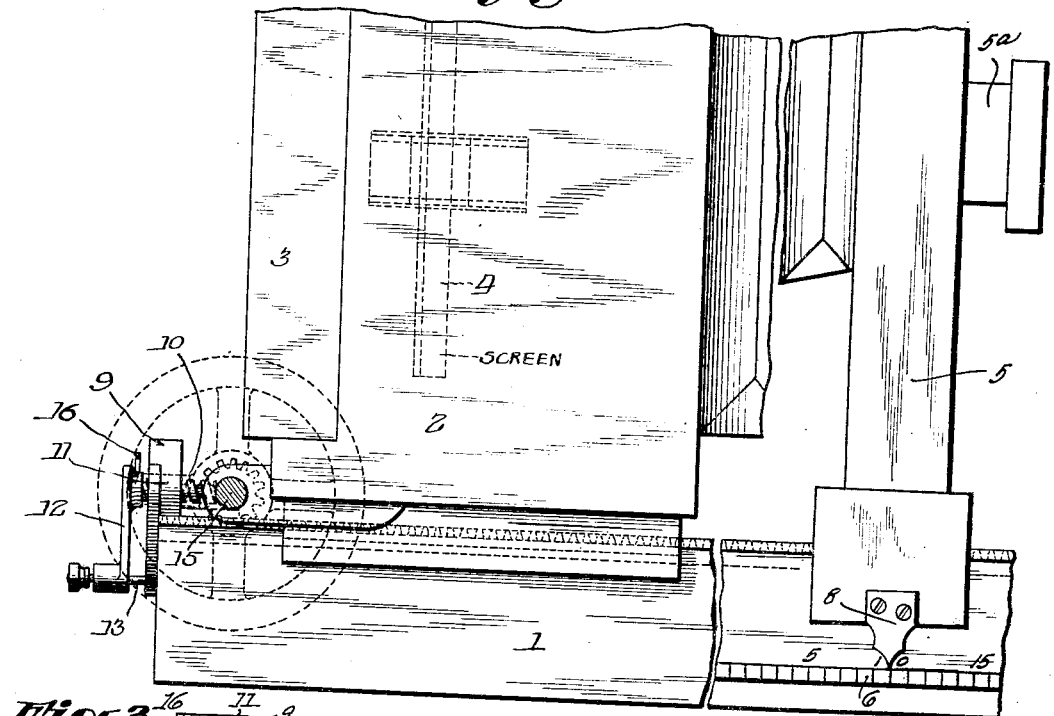
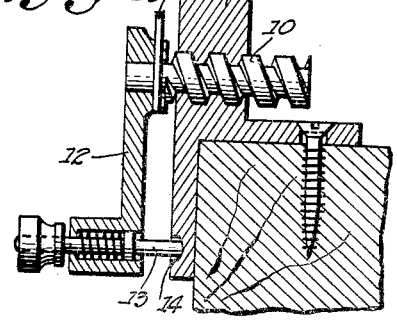
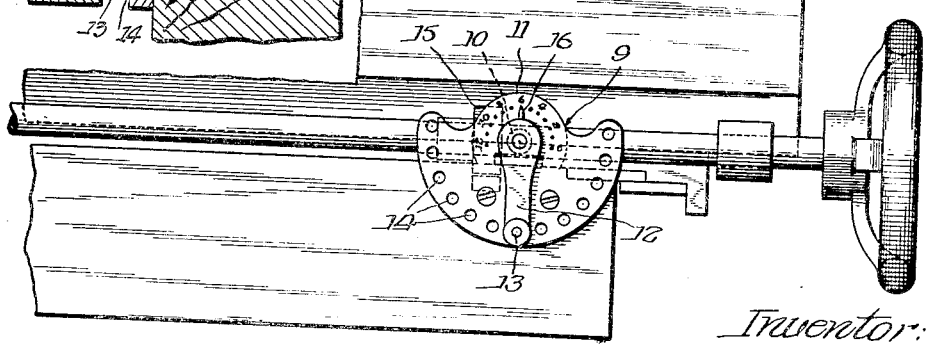
Inventor:
James Borivoj Cernohouz.
By Wilkinson, Huxley, Byron & Knight
Attys.

Patented Aug. 22, 1939

2,170,630

UNITED STATES PATENT OFFICE 2,170,630

SCREEN FOCUS COMPENSATOR

James Borivoj Cernohouz, Chicago, Ill., assignor to Robert R. Robertson, Chicago, Ill.

Application October 18, 1937, Serial No. 169,538

3 Claims. (Cl. 95—81)

This invention relates to photographic cameras of the type in which the distance between the lens and the focal plane, for focusing purposes, is determined through means of a measuring instrumentality exposed on the exterior of the camera rather than by the less economical and less convenient method of exposing to view a ground glass in the focal plane and inspecting the image projected thereon. More particularly, the invention relates to those cameras of the type referred to which are equipped for the introduction, across the focal axis, of a screen ruled for producing halftone effects upon negatives and which screen, being made of glass and having an inherent index of refraction, causes the image projected by the lens through the screen to focus in quite a different plane than if the camera were used for simple line work in which the halftone screen is omitted.

In the manipulation of commercial copying cameras, it has long been the practice to determine the size of the reproduction, which is a function of the distance between the copyboard and the lens, by the use of a computing gauge calibrated in terms of the dimensions of the object to be copied, the dimensions of the reproduction desired, and the distance between the lens and copy holder on the one hand and the distance between the lens and the focal plane on the other hand appropriate to the dimensions selected, and to utilize readings thus produced by the computing gauge to identify points on the scales or measures to which the frames of the camera are to be adjusted. But for reasons before stated, readings afforded by the computing gauge which are appropriate and accurate for camera adjustments in work omitting the screen, are wholly unsuitable for work in which the screen is used, as inherent refraction of the screen determines quite a different focal plane.

The present invention provides means whereby differently constructed cameras that have their focusing adjustments determined by scales, whether calibrated in terms of absolute measurement or terms of a computing gauge, can utilize the same scale and computing gauge (if used) in determining focusing position whether the work be carried on with a halftone screen requiring compensation in measurements or without such screen; and the invention proceeds upon the principle of providing, in connection with this type of scales, a datum point adjuster through means of which an initial point of measurement or datum point may be determined from which all measurements will be computed and for which, therefore, one and the same measuring scale may be used in all cases. For instance, if in determining the proper position of a camera lens, the lens frame is slid upon the camera mounting while the focal plane remains at rest and the distance of movement is indicated by having the lens frame draw out a scale that simulates in form a coiling and uncoiling tape measure, the increased distance required to compensate screen refraction will be insured according to the present invention, not by a change in the reading on the scale but by merely elongating the connection between the outer end of the scale and the lens frame sufficiently to give to the lens frame its new datum point, measurements from which, when read upon the scale, will accurately indicate a desired focal condition in correspondence with the reading of a computing gauge. Or if, in a camera in which the lens frame carries its own indicator cooperating with a fixed scale on the mounting of the camera, increased distance is required to compensate refraction imposed by the glass screen, it will be secured not by disarranging the fixed camera scale or the readings thereon, but by giving to the focal plane frame a new datum point of measurement in rear of that which it occupies for line work, and which new datum point will be determined by the adjustment of a back-stop calibrated in agreement with disarrangement of focal distance introduced by the screen.

The invention further contemplates a camera having conventional means for establishing a normal focus through means of relatively movable front and back frames and a measuring scale adapted thereto in the procurement of normal focus without regard to the disturbing influence of a glass half-tone screen and means whereby a focus correcting adjustment may be attained appropriately to the presence of such a screen by the adjustment of the rear frame alone, controlled by an adjustable stop that arrests rearward movement of the rear frame without disarranging the relation between measuring scale and the front frame.

In the accompanying drawing—

Figure 1 is a side elevation and Figure 2 an end elevation of the preferred embodiment of the invention;

Figure 3 is a sectional detail view of the adjustable back stop on an enlarged scale.

Referring to Figures 1 and 2, 1 represents a base frame upon which is mounted a light-tight chamber 2 serving as a focal plane frame, and carrying a ground glass or plate holder 3, and a halftone screen 4 replaceably mounted within it. 5 represents a lens frame also mounted upon the frame 1 and which, by its adjustment on said frame, perfects normal focus of an image projected by the lens 5a immediately upon the focusing surface in focal frame 2, when no screen 4 intervenes. This lens frame 5 has means through which to express in predetermined terms of measurement, the position of lens 5a relatively to the focal plane; for instance, a scale 6 on the base frame 1, relatively to which pointer 8 on lens frame 5 moves in focal adjustments of the lens frame.

When, in the manipulation of a camera as just described, a halftone screen 4 is introduced in the focal axis and, being of glass, introduces refraction as a factor in the computed focus, thereby causing the focal plane to assume a position further to the rear from the lens than when the screen is not used, it becomes necessary to correspondingly correct the datum point of focal measurement so that any given reading at the index 8 will in fact correspond to a greater distance between lens and focal plane. The present invention realizes this increase of distance by adjusting the focal frame rearwardly, and governs the necessary adjustment by the use of datum point adjuster 9 which consists of a stop screw 10, preferably of quick-pitch, threaded into the housing 11 and serving as a stop to limit rearward movement and thereby determine the initial position or datum point of focal plane frame 2 relatively to which the lens frame 5 must move in establishing the focus. Mounted upon stop or screw 10 is a crank 12 serving the combined purposes of manipulating the said screw, acting as an indicator of the angle of revolution through which it is adjusted, and, through means of its arresting bolt 13 taking into the recesses 14, holding the screw to its selected angular adjustment. Preferably the screw 10 is of quick pitch so that all adjustments desired to be effected through it will be included in an arcuate movement less than a complete revolution.

In establishing a new datum point for the focal screen frame, commensurately with the influence of refraction imposed by the screens, the datum point adjuster 9 is mounted with its screw 10 in the position of an adjustable backstop for an element moving with the frame 2, to-wit, in this instance, the rack and pinion adjusting mechanism 15; the crank 12 for turning the screw 10 in its threaded housing 11, as well as the arresting bolt 13.

Inasmuch as it is conventional to have a plurality of different screens for use interchangeably with one and the same camera and these screens will impose different refractive effects upon the focused light beam, the present invention provides the datum adjuster 9, as shown in Figure 4, with as many recesses 14 as there are adjustments desired in the use of the adjuster, and into these, bolt 13 may seat at different angular adjustments of the crank 12.

In the illustrative embodiment of the invention, crank 12 is further provided with an index 16 coacting with index characters, for instance, Arabic numbers arbitrarily assigned to the screens of different refractive effect with which the camera must be used so that, given the number of a screen that must be used for a particular piece of work, it is merely necessary to adjust the crank until the index points to the corresponding number. This will insure the proper datum adjustment by arresting rearward movement of the focusing frame through the medium of rack and pinion adjusting mechanism 15 in Figures 3 and 4.

I claim:

1. In photographic copying apparatus, the combination of a lens frame, a focal plane frame, means removably mounting a half-tone screen in effective relation to the focal plane frame, said lens frame being free to receive measured focusing movements relatively to the focal plane frame, said focal plane frame being free to receive corrective focusing movement rearwardly from and independently of said lens frame and a stop arresting said rearward movement of the focal plane frame, adjustable in the direction of said movement, and having calibrated means for fixing it at different degrees of adjustment commensurate with the refractive effects of different half-tone screens used in the camera.

2. In photographic apparatus as described in claim 1 in which the stop comprises a screw-threaded shaft, a crank arm for rotating said shaft, a releasable arresting latch on said crank arm and an arcuate series of keepers with which said latch cooperates, located to arrest the crank arm through its latch, in positions which present the shaft at frame-arresting points appropriate to focal corrections necessitated by the several different half-tone screens.

3. A photographic copying camera comprising in combinaiton, a bed, a lens-frame carrying a lens, and a focal plane frame carrying the focal surface against which light beams are projected by said lens; said frames being each independently movable upon said bed and being adapted, by movement of one relatively to the other, to focus a projected image immediately upon said surface; said lens frame having means registering its focal position relatively to said surface in terms appropriate to such immediate focusing; means for replaceably mounting in the camera, any one of a plurality of glass screens in a relation to said surface that modifies the projected image appropriately to half-tone photography; means for imparting to said focal plane frame, on said bed and independently of the lens frame, a corrective focal movement that increases the focal distance of said surface from the lens appropriately to the refractive effect of a glass screen upon the projected light beam; an adjustable stop that predetermines the measurement of said corrective movement; and means registering adjustments of said stop, calibrated in correspondence with the refractive characteristics of the different screens employed.

JAMES BORIVOJ CERNOHOUZ.